March 21, 1939.   L. B. ADES   2,151,291
MACHINE TOOL
Filed Aug. 28, 1937    2 Sheets-Sheet 1

Inventor:-
Lewis B. Ades,
By his Atty.

March 21, 1939.                L. B. ADES                2,151,291
                              MACHINE TOOL
                         Filed Aug. 28, 1937           2 Sheets-Sheet 2

Fig. 2.

Inventor:—
Lewis B. Ades,
By [signature]
       Atty.

Patented Mar. 21, 1939

2,151,291

UNITED STATES PATENT OFFICE 2,151,291

MACHINE TOOL

Lewis B. Ades, Rockford, Ill., assignor to Sundstrand Machine Tool Co., Rockford, Ill., a corporation of Illinois Application August 28, 1937, Serial No. 161,477

12 Claims. (Cl. 82—2)

This invention relates to machine tools, and particularly to tools requiring numerous separate controls to govern their operation.

One object of the invention is the provision of a new and improved machine tool in which all operations are controlled at one end of the machine.

Another object is the provision of a new and improved machine tool in which all operations are controlled and loading of the machine is effected from one and the same end of the machine by means all within easy reach of a single operator working at said one end of the machine.

Still another object is a new and improved power operated lathe equipped with a work supporting spindle having a manually operated power chuck for securing the work thereon, a clutch for applying the power and a releasable feed all controlled by independent levers located at the loading end of the machine to facilitate operation.

A further object is the provision of a new and improved lathe driven by an electric motor comprising a work spindle having independent means for securing the work thereon, a releasable slow feed mechanism and fast return, and a clutch for controlling the application of the power, each of said parts being provided with independent levers positioned for manual operation by a single workman at the loading end of the machine.

Further objects and advantages will appear as the description proceeds, taken in connection with the accompanying drawings which form a part of this application.

Fig. 2 is an end elevation of the lathe shown in Fig. 1.

Figure 1:
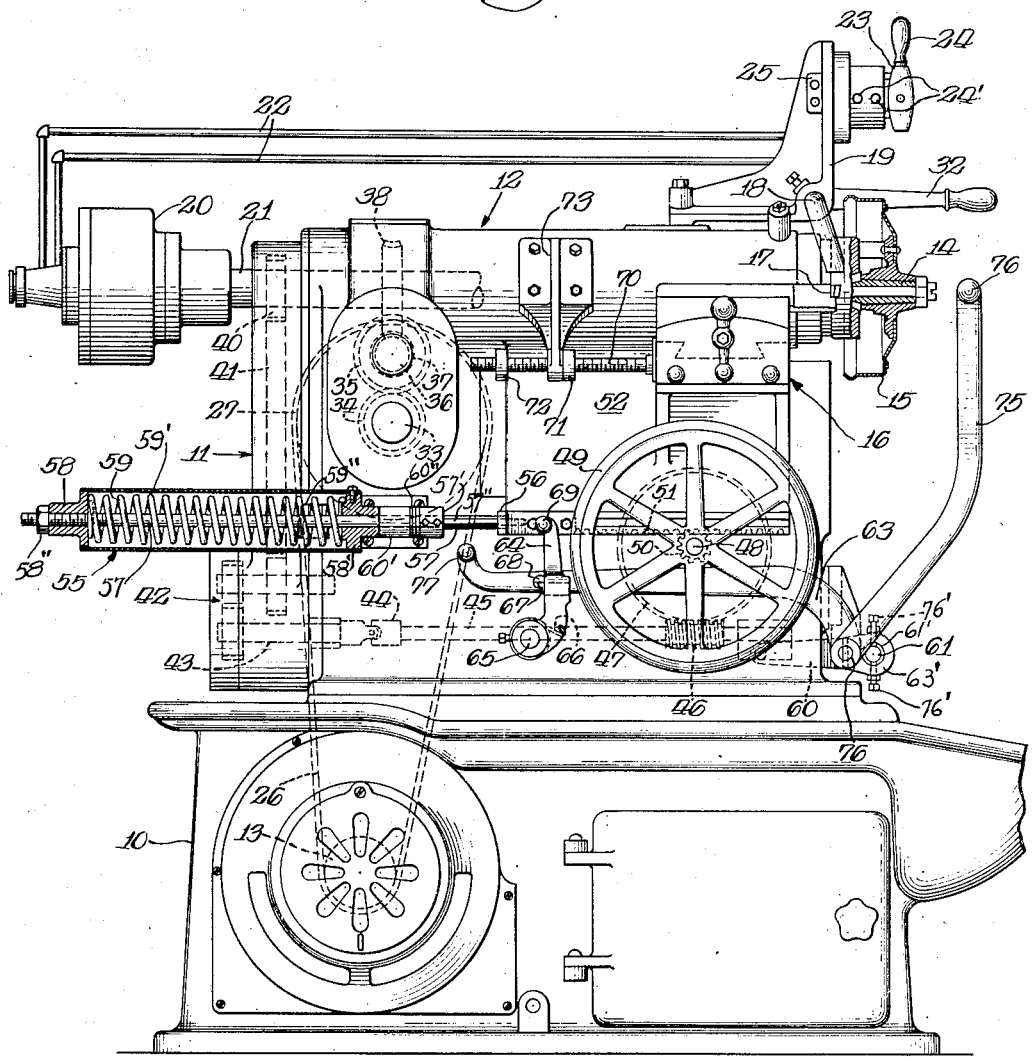
Fig. 1 is a side elevation of a lathe showing the invention.

While I have shown in the drawings and will herein describe in detail the preferred embodiment of my invention it is to be understood that I do not thereby intend to limit the invention to the specific form disclosed, but aim to cover all modifications and alternative constructions falling within the spirit and scope of the invention as expressed in the appended claims.

In machine tools of appreciable size, such as a lathe of the type here disclosed, it is extremely desirable from the point of view of convenience and economy of design and operation, that the entire mechanism for operating the machine be located so as to be accessible to a single operator or mechanic when standing in one position. Furthermore, in a lathe of this character and size, a number of independently operable parts are required, each having its separate control lever, and in order that the machine may be operated by a single workman whose duty it is to load the work upon the machine, it is extremely desirable that control levers for fastening the work to the machine, for starting the machine, and for controlling it during operation be within easy reach of the mechanic so employed, so that he need not step away from his position while the machine is in operation.

A machine tool known generally as a power lathe has been chosen to illustrate the embodiment of the invention herein described, and consists, in general, of a lathe having a horizontal stationary work supporting spindle, a power operated chuck for securing the work upon the spindle and a train of gears for rotating the spindle and for simultaneously driving a tool carriage through a slow feed movement. An automatic rapid return is likewise incorporated in the device for repositioning the tool carriage in an initial position after each feeding cycle preparatory to the next successive feeding operation. There is further provided a tool relief mechanism which functions at the end of the feed stroke to shift the tool away from the work, so that it may be freely returned to an initial position.

The machine comprises a base portion 10 which supports a frame generally designated 11 having a headstock designated 12 cast integrally therewith. An electric motor 13 located in the base furnishes the power for driving a work supporting spindle 14 upon which the work piece 15 is mounted, and a tool carriage generally designated 16 reciprocates longitudinally with respect to the spindle for carrying a tool 17 to and away from the work. To assist in positioning the work piece upon the spindle 14 there is provided an L shaped guide bar 18 secured adjustably in a bracket 19 bolted to the top side of the headstock.

When it is desired to place the machine in operation, the work piece 15, here shown to be a large cuplike piece approximating the design of a brake drum, is mounted upon the spindle 14. The work piece is secured tightly in place thereon by means of a more or less conventional pressure operated chuck consisting essentially of work piece securing means and a pressure operated device 20, for actuating the securing means, supported at the left end of a shaft 21 which carries the work supporting spindle 14. The device 20 is connected by means of the pressure lines 22 to an air valve 23 supplied with air at the ports 24' from some suitable source. A valve handle 24 located at the right or loading end of the machine above the work supporting spindle and within easy reach of an operator standing at that end, is used to turn the air valve 23 on and off when it is desired to secure the work piece to or remove it from the spindle. After the work piece is properly mounted upon the machine, the electric motor 13 is started by pressing the push button 25, also located at the loading end of the machine adjacent the air valve.

Once started, power from the electric motor 13 is conveyed by means of a belt 26 to a pulley 27 mounted on a shaft 33 and this continues to run while there is work to be done. When it is desired to initiate a working stroke, a clutch 30 located within a portion 31 of the frame 11 is thrown into engagement by means of a manually controlled lever 32, located near and easily accessible from the loading end of the machine.

When the clutch is engaged, the shaft 33 rotates, and with it a pick-off gear 34, which in turn meshes with a pick-off gear 35 on a shaft 36, from which the motion is transferred by means of a worm 37 and worm wheel 38 to the shaft 21 which drives the work supporting spindle at a speed determined by the selection of relative sizes of the pick-off gears just described.

When the spindle is thus set in rotation, the power is transferred by means of a cogwheel 40 and chain drive 41 to a set of speed changing pick-off gears generally designated 42 which operate to drive the connected shafts 43 and 45 joined together by means of a universal joint 44. For driving the carriage, the shaft 45 carries on it a worm 46 which meshes with a worm wheel 47 of large diameter keyed to a shaft 48 upon which is positioned a large exterior hand wheel 49.

With the shaft 48 set in rotation, a pinion 50 keyed thereto rotates in mesh with a rack 51 rigidly secured to a downwardly extending or apron portion 52 of the tool carriage 16. By this means, the tool carriage 16 is driven longitudinally through a feeding or cutting stroke by operation of the electric motor 13.

When the tool carriage reaches the end of the stroke, it becomes desirable to interrupt travel of the carriage in that direction and return it to an initial position, preparatory to starting operation on the next work piece to be machined. Accordingly during the driving of the carriage through a slow feed movement, pressure is built up in a spring return device designated generally 55, which is operative at the end of the feeding stroke to return the tool carriage rapidly to an initial position, as soon as the power applied to the carriage in a feeding direction is released. To effect the release, there is provided a dog 56 adjustably secured to the lower left corner of the apron 52 of the tool carriage, which dog functions in a manner hereinafter set forth.

The spring operated carriage return device 55 is herein illustrated as comprising a round rod 57, the right hand end of which is secured to the carriage apron 52, and the left hand end of which is threaded to a cylindrical guide member or piston 58 provided with a lock nut 58''. Intermediate its ends, this rod passes through a supporting bracket 60' secured to the bed of the lathe and also extends through a cylindrical casing 59' in which the guide member 58 is slidable. The casing 59' has a bushing 58' secured in its right hand end (Fig. 1) and a coil spring 59, positioned between the bushing 58' and the piston 58 and surrounding the rod 57, is effective to return the carriage 16 after a feeding movement. The rod 57 has a flat 57'' milled adjacent its right hand end so that a collar 57' may be effectively secured thereto by set screws. A plurality of leather spacing washers 60'' are preferably inserted intermediate the collar 57' and the bracket 60', and to prevent the piston 58 and casing 59' from acting as a dashpot an opening 59'' is provided in the right hand end of the casing. The shaft 45, upon which is mounted the worm 46, is held upward in the position shown in Fig. 1 in which the worm 46 and worm wheel 47 are in mesh by means of a lever 60, loosely pivoted intermediate its ends upon a shaft 76 journaled in projections 62 on the frame 11. In order to rock the lever 60 and to hold the same in a position effecting a meshing of the worm and worm wheel 46 and 47 respectively, a curved arm 63 is provided which is fixed on the shaft 76 and extends horizontally behind the hand wheel 49 toward the middle of the machine. At the end fixed on the shaft 76, the arm 63 has integral therewith an extension 63' provided with a bore 61' having received within it a pin 61 projecting laterally from the lever 60 at the end opposite the end engaging the shaft 45. The bore 61' is larger than the pin 61 and the latter is adjustably connected with the arm 63 by means of screws 76'. It will be apparent from the foregoing, that by swinging the arm 63, the extension 63' will also be rotated which, in turn, will rotate the lever 60 through the medium of the pin 61. Since the pin 61 is carried by the lever outwardly of the shaft 76, movement of the pin 61 downwardly tilts the lever 60 so that the other end is lifted to elevate the worm 46 into engagement with the worm wheel 47. Conversely, a movement of the lever 60 and the pin 61 in the opposite direction will release the worm from the worm wheel. The movement of lever 60 is small, being barely enough to clear the teeth of the worm and worm wheel, and this movement can be adjusted by setting the screws 76' up or down so that the pin 61 is shifted up or down in the bore of the extension 63', in order to alter the angular displacement between the arm 63 and the lever 60.

In order that the arm 63 may be retained in a position in which the worm 46 is held upwardly in engagement with the worm wheel 47, there is provided a vertically disposed lock up bar 64 pivoted at its lower end to the frame 11 at 65 and urged rotatably in a counterclockwise direction, as viewed in Fig. 1, by means of a torsion spring 66. At one edge of the bar 64, intermediate the end thereof, is a projection 67 which is adapted to engage with a flat sided pin 68 mounted upon the arm 63. When the projection 67 is in a position supporting the pin 68, the arm 63 is held thereby in an upward position and, because of being rigidly connected with the lever 60, serves to maintain the lever in an upward position and the worm 46 in mesh with the large worm wheel 47.

As the tool carriage moves through a working or tooling stroke, from left to right, as viewed in Fig. 1, the dog 56 advances to a position where it comes into contact with a knob 69 on the upper end of the bar 64. As the carriage continues to move toward the right, the dog pushes against the bar 64 so as to rotate it in a clockwise direction, a distance sufficient to disengage the projection 67 from the pin 62. Upon disengagement, the arm 63 is allowed to drop which in turn allows the lever 60 to drop, thereby permitting the worm 46 to become disengaged from the worm wheel 47. When this has been accomplished, movement of the carriage in a feeding direction ceases, although the shaft 45 and attached worm 46 continue to rotate.

During movement of the tool carriage from left to right, the coiled spring 59 is compressed and thereafter, as soon as the carriage is released from its driving mechanism, the energy stored up in the compressed spring 59 serves immediately to return the carriage rapidly from right to left to its initial starting position, determined by abutment of the collar 57' against the bracket 60'.

In order that the finished work piece may not be damaged during the return stroke of the tool carriage, a tool relief mechanism is supplied, consisting in part of a threaded rod 70, attached to a suitable mechanism within the tool carriage, more fully described in the Timothy B. Buell Patent No. 2,002,933, issued May 28, 1935, which has mounted adjustably upon it collars 71 and 72. These collars are adapted to abut in one direction or another against a shoulder piece 73 bolted to the headstock 12. When, for example, the tool carriage has been moved toward the right to the end of its feeding stroke, the collar 72 operates through the threaded rod 70 to withdraw the tool 17 away from the work piece and when the carriage has been moved toward the left to its initial position, the collar 71 operates through the threaded rod 70 to replace the tool 17 in cutting position.

After the carriage has been returned to its initial position, the operation of the machine may be stopped by disengagement of the clutch 30 and the work piece may then be removed. Since the worm 46 is not usually automatically repositioned to mesh with the worm wheel 47, repositioning may be accomplished manually to so reset the machine. A control lever 75 is provided for that purpose at the loading end of the machine equipped with a handle 76 which can be grasped by the operator. The control lever is rigidly connected with the lever 60 and the arm 63 by being keyed to the shaft 76 so that when shifted, all of the parts move as a unit. Consequently, when the control lever 75 is pulled outward away from the machine, in a direction from left to right, as viewed in Fig. 1, the arm 63 and the lever 60 are rotated to a position where the worm 46 again meshes with the worm wheel 47.

In this position, the bar 64, which has been previously flexed slightly in a clockwise direction, snaps back again under the pin 68 which is raised by motion of the arm 63 to a position above the projection 67, so that the arm 63 is by this means again securely held in an upward position preparatory to another feeding operation.

It will be apparent from the foregoing, that I have provided a machine of improved construction, more particularly, a brake drum lathe having the controls for the lathe located in a unique relationship to the work supporting spindle as a result of which the efficiency and production of the lathe is greatly increased. More particularly, the production of the lathe is increased by the construction disclosed, because all of the controls for the machine are located at the loading end of the machine so that the operator, while remaining in one position at the end of the machine, may load the work pieces axially onto the spindle, and without moving from that position, initiate and control the operation of the machine. This not only eliminates the loss of time heretofore resulting from the necessity of the operator changing his position for each loading and unloading operation, but also reduces the possibility of injury to the work because of the ready accessibility of the controls to the operator. The production of the machine is also increased by the provision of a means for effecting rapid return movement of the tool carriage. This means is of extremely simple construction in order not to increase the cost of the machine materially, yet it is admirably suited for the type of machine tool disclosed.

I claim as my invention:

1. A lathe provided with a work carrying spindle, a power drive therefor having a starting button, a manually operated clutch for said drive and a manually operated power chuck for the spindle, a reciprocating tool carriage provided with a first means connected with the drive for effecting a slow feed movement, a second means including a resilient member for effecting a rapid return movement, and releasable manually operated means for setting the first means in position for a feeding movement, said work carrying spindle and said starting button together with all said manually operated means being located at the loading end of the machine so that an operator standing in one position at said loading end can control all of the mechanical movements governed thereby.

2. A brake drum lathe provided with a spindle adapted at one end to support a substantially cylindrically shaped and axially mounted work piece positioned centrally thereon, said spindle being mounted for rotation upon the lathe in a fixed longitudinal position with the work supporting end extending outward therefrom and actuated by a manually controlled power drive, a manually controlled power chuck associated with the spindle for holding said work piece thereon, and a reciprocating tool carriage provided with releasable means for effecting a slow feed movement together with a manually controlled means for setting the releasable means in feed position, said work supporting spindle and all said manual controlling means being located at the end of the machine adjacent the work supporting end of the spindle.

3. A lathe comprising, in combination, an elongated frame, a work supporting spindle rotatably mounted in the frame and projecting at one end from the frame for supporting a work piece, a power chuck for securing a work piece on the projecting end of the spindle adapted to receive or discharge a work piece by axial movement of the work piece relative to the spindle by an operator of the machine standing at the end of the machine opposite the projecting end of the spindle, a manually operable control for governing engagement or release of a work piece by the spindle disposed at the loading end of the machine in a position to be grasped by one hand of the operator while holding the work piece in position with the other hand, a tool supporting carriage slidably mounted on one side of the frame for longitudinal movement relative to the frame, power means for rotating said spindle and for driving said tool carriage through a feeding movement relative to the work piece including a source of power and means for rendering the last named means effective or ineffective to drive the spindle and the carriage, and manual controls for governing the operation of the spindle and the tool carriage also located at the loading end of the machine within easy reach of an operator while standing at the loading end of the machine in position for loading or unloading work pieces from the spindle.

4. A brake drum lathe comprising, in combination, an elongated frame, a work supporting spindle rotatably journaled in said frame and extending longitudinally thereof and projecting at one end therefrom, chuck means for securing the work on the projecting end of the spindle adapted to permit loading and unloading of the work by axial movement relative to the spindle by an operator standing at the end of the machine, power means for rotating the spindle including a source of power and means for rendering the same effective to rotate the spindle, a tool supporting carriage slidable longitudinally of the frame on one side thereof, means providing a releasable driving connection between said spindle and said tool carriage, and manually operable controls for the chuck, the means rendering the power source effective and the releasable driving connection between the spindle and the carriage all located at the loading end of the machine within easy reach of an operator while standing in a position for loading or unloading work pieces on or from the projecting end of the work supporting spindle.

5. A semi-automatic brake drum lathe adapted to be loaded and operated from a position opposite the loading end thereof comprising a frame, a clutch for connecting a system of moving parts, a source of power, a control lever for the clutch on the right at the loading end, a work carrying spindle driven by a train of gears connected with the clutch and provided with a chuck positioned at the loading end of the lathe together with a manual control, said chuck being operated by a motive means at the other end of the spindle connected with a manual control, a tool carriage mounted for reciprocation along the side of the lathe, said tool carriage being provided with a drive mechanism and lever means at the loading end adapted to initiate movement of the tool carriage, a carriage release mechanism and an automatic return mechanism for the carriage comprising a reciprocating rod connected at one end to the carriage and at the other end with a coiled spring, said spring being compressible during movement of the carriage in one direction and releasable by action of the carriage at the end of its stroke in said direction, there being also provided a pair of engaging devices attached to a rod connected with a tool relief mechanism contained within the carriage cooperable with a portion of the frame for providing tool relief at the end of a tooling stroke and for resetting the tool mechanism at the end of a return stroke.

6. A semi-automatic lathe adapted to be loaded and operated from a position opposite a loading end thereof comprising a frame, a clutch for connecting a system of moving parts, a source of power, a control lever for the clutch located at the loading end of the lathe, a work carrying spindle driven by a train of gears connected with the clutch and provided with a chuck positioned at the loading end of the lathe together with a control therefor also positioned at the loading end, a tool carriage reciprocable along the side of the lathe, said tool carriage being provided with a drive mechanism comprising a tiltable drive shaft provided with a universal joint and cooperable through a train of disengageable gearing with said carriage and having a free end carrying one element of the disengageable gearing, and a carriage release mechanism including a pivotally mounted arm engaging a free end of the drive shaft, a pair of levers operatively associated with said pivoted arm to swing the same, one of said pair of levers extending upward and terminating in a handle at the loading end of the machine adapted to be pulled forward to tilt said arm upward in order to lift the drive shaft and the element carried thereby into engagement with the train of gearing, the other of said pair of levers extending horizontally along the lathe, a spring pressed bar pivoted to the frame having a temporary engagement with said last mentioned lever and during such engagement supporting said lever to engage the disengageable gearing, a dog mounted on the tool carriage in abutting relation with the bar when carried to the forward end of a tooling stroke so as to release the temporary engagement of the bar with said last lever to disengage the train of gearing, and a resilient member connected at one end to the carriage and at the other end to the frame, said member being potentiated while the carriage is positively driving through a tooling stroke and operating to return said carriage to initial position at a traverse rate upon disengagement of the gearing.

7. A lathe comprising, in combination, an elongated frame, a work supporting spindle rotatably journaled in said frame extending longitudinally thereof and projecting at one end therefrom, chuck means for securing the work on the projecting end of the spindle adapted to permit loading and unloading of the work by axial movement relative to the spindle by an operator of the lathe standing at the end of the lathe, a tool supporting carriage slidable longitudinally of the frame and the spindle, power means for rotating the spindle and for driving said carriage, and manually operable controls for the chuck and for the drive of the spindle and the carriage all located at the loading end of the lathe and positioned within easy reach of an operator standing at the end of the lathe to be grasped and manipulated by the same hand of the operator while the other hand grasps a work piece for loading or unloading the same axially onto or off of the projecting end of the work supporting spindle.

8. A lathe comprising, in combination, an elongated frame, a work supporting spindle rotatably journaled in said frame extending longitudinally thereof and projecting at one end therefrom, chuck means for securing the work on the projecting end of the spindle adapted to permit loading and unloading of the work by axial movement relative to the spindle, a manually operable control for the chuck means located adjacent the projecting end of the spindle enabling an operator standing at the end of the lathe to actuate the control with one hand while the other hand is loading or unloading a work piece onto or off of the spindle, a tool supporting carriage slidable longitudinally of the frame, power means for rotating the spindle and driving said carriage including a source of power and means for rendering the same effective to rotate the spindle and to drive said carriage through a tooling movement, and a manually operable control for the means for rendering the source of power effective located at the loading end of the lathe and on the same general side of the spindle as the manual control for the chuck means so as to be manipulable by the same hand of the operator of the lathe while remaining in the position at the end of the lathe assumed during the loading or unloading of a work piece from the spindle.

9. A lathe comprising, in combination, an elongated frame, a work supporting spindle rotatably journaled in said frame extending longitudinally thereof and projecting at one end therefrom, chuck means for securing the work on the projecting end of the spindle adapted to permit loading or unloading of the work by axial movement relative to the spindle, a tool supporting carriage slidable longitudinally of the frame, power means for driving said spindle and said carriage including a source of power, means for rendering the same effective to rotate the spindle and means for rendering the same effective to drive said carriage, and a manually operable control for each the chuck means, the means rendering the power source effective to rotate the spindle, and the means for rendering the power source effective to drive said carriage, said manual controls all located at the end of the lathe at which the spindle projects with said control for the chuck means positioned to be actuated by one hand of an operator standing at the end of the lathe while the other hand may grasp a work piece to load or unload the same onto or off of the spindle by axial movement of the work piece, and said remaining controls being positioned to be manipulated by the operator while remaining in the position taken for the loading or unloading of the work piece.

10. A machine tool provided with a work supporting member extending longitudinally thereof and projecting at one end therefrom to provide for loading or unloading of the machine from a position at the end of the machine and by movement of a work piece axially of the work supporting member, a power drive, means for initiating operation of said drive having manual operating means therefor, a reciprocating tool carriage provided with releasable means for effecting a feeding movement, and manual operating means for setting the releasable means in feed position, both said manual operating means being located at the loading end of the machine adjacent the projecting end of said supporting member so that an operator standing in one position opposite said projecting end can control all of the mechanical movements governed by said manual operating means.

11. A lathe comprising, in combination, an elongated frame, a work supporting spindle rotatably journaled in said frame, said spindle extending longitudinally of the frame and projecting at one end therefrom and adapted at that end to receive and support a work piece, a tool supporting carriage slidable longitudinally of the frame, a source of power for driving said spindle and said carriage, means for rendering the source of power effective to rotate the spindle, a manual control for said means located at the end of the lathe at which the spindle projects, means for rendering the source of power effective to drive said carriage through a tooling operation, means actuated as an incident to the completion of a tooling movement by said carriage to arrest tooling movement of said carriage and effect a return movement thereof, and a manual control for said means rendering the power source effective to drive said carriage through a tooling movement to recondition the same after return of the carriage, said manual control being located at the end of the lathe at which the spindle projects to permit loading of the spindle and control of the lathe from one position at the end of the lathe.

12. A lathe comprising, in combination, an elongated frame, a work supporting spindle rotatably journaled in said frame extending longitudinally thereof and projecting at one end therefrom, chuck means for securing the work on the projecting end of the spindle, a manual control for said chuck means located above the projecting end of the spindle to be grasped and manipulated by one hand of an operator standing at the end of the lathe while the other hand is free to apply a work piece to the end of the spindle, a tool supporting carriage slidable longitudinally of the frame, power means for driving said spindle and said carriage including a source of power, a means common to the spindle and the carriage for rendering the power source effective to drive the same, and a means individual to the carriage for rendering the power source effective or ineffective to drive said carriage, and a manual control for said common means located at the end of the lathe to one side of the projecting end of the spindle and at the level of the spindle and a manual control for said individual means located at the end of the lathe on the opposite side of the spindle and at the level of the spindle.

LEWIS B. ADES.